3,743,605
DISPERSING AID-CONTAINING BLOWING AGENTS FOR POLYMERS AND METHOD OF USING THE SAME
Robert C. La Clair, New Haven, Conn., assignor to Uniroyal, Inc., New York, N.Y.
No Drawing. Filed June 2, 1971, Ser. No. 149,392
Int. Cl. C06d; C09k 3/00
U.S. Cl. 252—350                                              3 Claims

ABSTRACT OF THE DISCLOSURE

A mixture is formed of a solid, particulate blowing agent and a solid, particulate inert inorganic compound of a metal having a specific gravity no greater than 4.5, the inert compound acting as a dispersing aid and the proportion thereof in the mixture being 1 to 5% by weight, based on the weight of the blowing agent. When this composition is mixed directly with a liquid or paste composition comprising a polymer, the blowing agent is completely dispersed in the liquid or paste. When the liquid or paste is then formed into a film and heated whereby the blowing agent decomposes, the film is free of defects characteristic of incomplete dispersion of blowing agent.

FIELD OF INVENTION

This invention relates to improved blowing agent compositions for the manufacture of foamed polymers. This invention also relates to a method of using the improved blowing agent compositions.

BACKGROUND OF THE INVENTION

To produce a cellular polymer foam having cells which are fine and uniform and which is free of voids, large pools of gas and has a smooth surface, the blowing agent which is mixed with the polymer composition must have a suitable decomposition temperature in order to release gas at the proper time and at a controllable, but reasonably rapid, rate and must be completely and uniformly dispersed in the polymer composition.

It is well known in the art that the decomposition temperature varies from one blowing agent to another and that certain blowing agents can be activated or retarded by various organic and inorganic compounds. Therefore, a blowing agent with the proper decomposition temperature is generally available. Furthermore, the rate of decomposition can often be controlled by the particle size of the blowing agent.

However, solid, particulate blowing agents do not generally lend themselves to easy and complete dispersion in a liquid or paste form polymer composition, such as a vinyl (vinyl chloride homopolymers, copolymers or mixtures of homopolymers and copolymers) plastisol. The powdered blowing agents contain very fine particles, generally in the range of 0.1 to 30 microns in diameter, which tend to agglomerate due to moisture, even in very minute amounts, static charge, and the like. Mixing the powdered blowing agent directly with a liquid or paste form polymer composition generally results in a substantial amount of agglomerated, undispersed particles which yield voids and large gas pockets when the polymer is fused and foamed. This undesirable phenomenon is particularly pronounced when azodicarbonamide is employed as the blowing agent for a vinyl plastisol, but is also to be observed in the case of other blowing agents and other liquid or paste form polymer compositions.

To overcome this difficulty, it is common practice for a manufacturer of foamed vinyl to make a paste of the blowing agent and a portion of the plasticizer used in the pastisol formulation or to purchase a commercially available paste of such nature. The blowing agent pastes usually contain 30 to 60%, by weight, of blowing agent and are made by blending the blowing agent and a plasticizer in a mixer and milling the resultant paste on a paint mill, ball mill or similar equipment to prevent settling of the blowing agent. This paste is then readily and completely dispersible in the vinyl plastisol by mixing in a Hobart or similar mixer. Although this method results in complete dispersion of the blowing agent, it has several disadvantages, including an extra compounding step which is time consuming and the need for expensive equipment to mill the blowing agent paste. On the other hand, the blowing agent is more expensive when purchased in the paste form.

Accordingly, it is an object of the present invention to provide a blowing agent composition in solid, particulate form which may be mixed directly with a polymer composition in liquid or paste form to obtain complete dispersion of the blowing agent in the polymer composition.

SUMMARY OF THE INVENTION

According to the present invention, a solid particulate blowing agent is blended with a solid, particulate inert inorganic compound of a metal having a specific gravity no greater than 4.5, the inert compound constituting a dispersing aid and the proportion thereof in the composition being 1 to 5% by weight, based on the weight of the blowing agent. The inorganic compound is "inert" in the sense that it does not decompose to form a gas when the polymer in the polymer composition is fused. Among the inert inorganic compounds which may be used in the present invention are aluminum oxide, silica aluminate, hydrated magnesium silicate, calcium silicate, silica gel, fumed silica, magnesium oxide, titanium dioxide, dibasic calcium phosphate, tribasic calcium phosphate, sodium silica aluminate, potassium silica aluminate, calcium silica aluminate, diatomaceous silica, sodium silicate, potassium silicate and calcium silcate.

When the aforementioned mixtures are mixed directly with a vinyl plastisol or other polymer composition in liquid or paste form, the blowing agent readily and completely disperses in the polymer composition. It is preferred that the dispersing aids be of small particle size and large surface area in order that small amounts by weight be sufficient to serve the desired function.

The dispersing aid may be blended with the blowing agent by any of the well known methods for blending two or more powders, such as dry tumbling, the use of a Waring Blendor, or the use of large scale blending or mixing equipment, such as rotating blade, plow-type, twin-shell V-type and the like blenders or mixers.

Any powdered blowing agent may be blended with a dispersing aid according to the present invention. Among the blowing agents may be mentioned azodicarbonamide, p,p'-oxybis(benzene sulfonyl hydrazide), p-toluene sulfonyl hydrazide, p-toluene sulfonyl semicarbazide and the like. Certain blowing agents, such as azadicarbonamide, at a stage in their manufacture, are in the form of aqueous slurries. The blowing agent is separated from the aqueous medium and dried, resulting in a lumpy condition. Then, the lumpy blowing agent is crushed. It is found that the dispersing aids of the present invention may be mixed in with the slurry, or with the wet blowing agent after the aqueous medium has been separated, or after the drying out before the crushing, or during the crushing, as well as after the crushing. Regardless of the point at which the dispersing aid is mixed in with the blowing agent, the thus produced blends excel in their stability towards caking caused by atmospheric moisture and are readily and completely dispersible in liquid or paste form polymer compositions. In all instances, the mixtures of blowing agents and dispersing aids of the present invention are free-flowing and non-agglomerating.

Vinyl plastisols in which the mixtures of blowing agent and dispersing aid of the present invention are directly dispersed, i.e. without first predispersing the blowing agent to form a paste, contain a vinyl resin, one or more plasticizers and, as desired or required to obtain the desired foam quality, one or more stabilizers, pigments or fillers. The vinyl resin may be any powdered vinyl chloride homopolymer, copolymer or combination thereof in any ratio. The plasticizers may be any of those known in the art. Dioctyl phthalate is the most commonly used plasticizers due to its excellent properties and low cost. The proportion of the plasticizer may be from about 30 to about 125 parts per 100 parts by weight of the resin (phr.). Generally, the plasticizer level is between about 50 and about 100 phr. The stabilizer may be any liquid or solid stabilizer, or combination thereof, known in the art and is generally used at a level of about 0.5 to about 6 phr. When a solid stabilizer is employed, it is normally predispersed in a portion of the plasticizer to ensure complete dispersion. Fillers and pigments may be used at levels of up to about 60 phr. The level of blowing agent may be from about 0.5 to about 30 phr.

The mixture of blowing agent and dispersing aid of the present invention is blended with the plastisol or other liquid or paste form polymer composition in a Hobart, Lighting, or other suitable mixer or blender to yield a uniform compound free of any undispersed particles of blowing agent. This compound is processed by the usual methods of casting or coating and heated above the fusion temperature of the resin and the decomposition temperature of the blowing agent ot produce a cellular foam having fine, uniform cells and being free of any large gas pools or pock marks in the surface which would be present if the blowing agent had not been completely dispersed.

The free-flowing blowing agent-dispersing aid compositions of this invention also result in much improved dispersion in dry thermoplastic resins during tumbling, compounding and mixing operations. During dry tumbling operations the mixtures of blowing agents and dispersing aids of the invention are more evenly coated on the resin than a blowing agent which has not been mixed with a dispersing aid of the invention. Thus, during subsequent compounding operations, extrusion, injection molding or other processing operations, the blowing agent of the blowing agent-dispersing aid mixture more completely disperses in the resin. For some applications, such as injection molding of foamed furniture and automotive products, a high degree of dispersion is often not necessary to obtain a satisfactory product; however, other applications, such as the production of foamed film or other thin products, do require complete dispersion of the blowing agent particles. In thin films, undispersed agglomerates of blowing agent result in surface blemishes and irregularities, and, when the blowing agent is decomposed, often holes in the film. The holes, although initially small, may enlarge or cause tearing of the film. The result is a poor quality product or loss of production time.

The mixtures of blowing agents and dispersing aids of the present invention are suitable for use in any polymer composition, including elastomer and rubber compounds, in which ordinary blowing agents and blowing agent compositions are used. In this respect, among thermoplastic polymers there may be mentioned polyolefins, such as polyethylene and polypropyleen, polystyrene, high impact polystyrene, acrylonitrile-butadiene-styrene polymers, styrene-acrylonitrile polymers, polycarbonates, vinyl chloride homopolymers and copolymers and the like. Blowing agent concentration may be from about 0.01 to about 30 phr. Other additives commonly used, such as antioxidants, stabilizers, lubricants, nucleating agents, wetting agents, and the like may also be incorporated with the polymer and the blowing agent-dispersing aid composition.

The invention will now be further described by reference to the following examples, some of which are according to the invention and others of which are for purposes of comparison.

EXAMPLE I

A commercial blowing agent, azodicarbonamide, in powdered form was added to a Hobart mixing bowl with the other ingredients of a vinyl compound as follows:

Ingredients:                               Parts by weight
    Polyvinyl chloride dispersion resin [1] _____ 100
    Dioctyl phthalate _____ 95
    Epoxidized soya oil _____ 5
    Dibasic lead phthalate _____ 3
    Azodicarbonamide _____ 2

[1] Specific viscosity=0.36 in nitrobenzene at 30° C. (ASTM D-1243).

All the ingredients of the vinyl compound were mixed in the Hobart mixer for ten minutes. A ten mil film of the resulting plastisol was drawn on a metal plate and heated in a forced air oven at 350° F. for one minute to result in fusion of the film without decomposition of the blowing agent. The resulting film was examined and a substantial number of undispersed agglomerates of azodicarbonamide were visible as yellow spots on the surface of the fused film. A second ten mil film was drawn on a metal plate and heated in the same oven at 350° F. for six minutes to effect fusion of the film and decomposition of the blowing agent. This film, too, was examined and some undispersed and unfoamed particles of azodicarbonamide appeared as yellow spots. In addition, the surface of the film was rough and large gas cells appeared throughout the foamed film. This example is for comparative purposes.

EXAMPLE II

One percent by weight of fumed silica (nominal particle size 0.012 micron) was added to a second sample of azodicarbonamide (identical lot as in Example I) and the fumed silica and azodicarbonamide were blended together in a Waring Blendor for one minute. The resultant blend was a free-flowing, non-agglomerating powder. The procedure of Example I was followed. Both the fused and the foamed films were free of any yellow, agglomerated, undispersed particles of azodicarbonamide. The foamed film had a fine, uniform cell structure with no large gas pockets and a smooth surface.

EXAMPLE III

The procedure of Example I was followed except that the azodicarbonamide was agitated in a Waring Blendor for one minute prior to being incorporated in the vinyl compound. Several undispersed agglomerates of the blowing agent were observed on the fused film. This example shows an improvement relative to Example I, but is inferior to the results of Example II. Thus, it is demonstrated that the silica and not the blending in Example II was the reason for the complete dispersion of the blowing agent.

EXAMPLE IV

Two percent of calcium silicate (average particle size 2.1 microns, 325 mesh screen, maximum 1% retained) was blended with azodicarbonamide for one minute in a Waring Blendor. The resulting free-flowing powder was then added to the previously mixed ingredients of the following representative vinyl flooring formulation and mixed for 10 minutes in a Hobart mixer.

Ingredients:                               Parts by weight
    Polyvinyl chloride dispersion resin [1] _____ 70
    Polyvinyl chloride blending resin _____ 30
    Dioctyl phthalate _____ 60
    Epoxidized soya oil _____ 5
    Dibasic lead phthalate _____ 3
    Azodicarbonamide _____ 2

[1] Specific viscosity=0.36 in nitrobenzene at 30° C. (ASTM D-1243).

Respective films were drawn and foamed as in Example I. Agglomerated and undispersed particles of azodicarbonamide were completely absent from the films. The foamed film was free of large cells and had a smooth surface.

EXAMPLE V

Respective samples of azodicarbonamide were individually blended with the following dispersing aids in the following proportions for one minute in a Waring Blendor to form free-flowing, non-agglomerating powders. Portions of each of the powders were then mixed with the vinyl compound of Example I and the procedure of Example I was again followed. The same procedure was again carried out with other portions of the powders after the powders had been stored for various periods of time of from 9 to 20 months. Inscribed on each of the films was a grid of 1 inch squares and agglomerates per square inch were counted. The results are indicated in the following table, in which the column headed "Additive" denotes the additive or the absence of additive and the percentage thereof by weight based on the weight of the azodicarbonamide, the second column indicates the agglomerates per square inch counted in the films prepared with the fresh powders, the third column indicates the number of months a portion of the respective powder was retained, and the last column indicates the number of agglomerates per square inch resulting in the film prepared from the stored powder.

TABLE 1

| Additive | Agglomerates per sq. in. | Age, months | Agglomerates per sq. in. |
|---|---|---|---|
| 1% aluminum oxide | 0 | 12 | 0 |
| 1% silica-aluminate | 0 | 12 | 0 |
| 2% hydrated magnesium silicate (talc) | <1 | 12 | 2.5 |
| 5% amorphous silica gel | 0 | 12 | 2.0 |
| 2% calcium silicate | 0 | 13 | 1.25 |
| 1% fumed silica | 0 | 12 | 0 |
| None | 15 | 12 | 10.25 |
| 4% magnesium oxide | 0 | 11 | 0 |
| 5% titanium dioxide (TiO$_2$) | 0 | 11 | 2.0 |
| 4% dibasic calcium phosphate | 0 | 11 | 1.5 |
| 2% tribasic calcium phosphate | 0 | 11 | 0 |
| 0.5% fumed silica | 0 | 12 | 7.0 |
| Do | 16.0 | 15 | 25.0 |
| Do | 15.0 | 20 | 16.0 |
| 2% calcium silicate | 0 | 11.5 | 0 |
| 1% fumed silica | 0 | 11.5 | 0 |

The particle sizes of the additives were as follows:

amorphous silica gel, average 10 microns;
hydrated magnesium silicate (talc), minimum 98% through 325 mesh screen;
aluminum oxide, nominal particle size 0.03 microns;
silica-aluminate compound, average 0.22 micron;
magnesium oxide, 100% through 325 mesh screen;
tribasic calcium phosphate, minimum 90% through 325 mesh screen;
dibasic calcium phosphate, minimum 90% through 325 mesh screen;
titanium dioxide (TiO$_2$), range 0.17–0.21 micron.

The agglomerate counts were for the fused unfoamed films. The foamed films containing the additives (dispersing aids) of the invention had fine uniform cells and no large gas pockets were observed.

The azodicarbonamide containing 0.5% fumed silica is a prior art product known as "Celogen AZ 1316." The variance in the results noted is due to the fact that Celogen AZ 1316 from three different lots was employed. In all instances it was observed that, at the least, after a period of storing, Celogen AZ 1316, due to its content of fumed silica being below the lower limit set in the present invention, is not suitable as a self-dispersing blowing agent composition.

EXAMPLE VI

The same procedure as in Example II was followed with the following chemical blowing agents being substituted for azodicarbonamide: p,p'-oxybis(benzene sulfonyl hydrazide); p-toluene sulfonyl hydrazide; and p-toluene sulfonyl semicarbazide. The fumed silica level was varied from 1 to 5% by weight based on the weight of the blowing agent. The results were not as pronounced as with azodicarbonamide; however, dispersion of each blowing agent was improved. The results are summarized in the following table:

TABLE 2

| Blowing agent | Untreated | Blended with fumed silica | Dispersion in vinyl plastisol Blowing agent alone | Dispersion in vinyl plastisol Blended with fumed silica |
|---|---|---|---|---|
| p-Toluene sulfonyl hydrazide | Caking | Free-flowing non-agglomerating | Poor | Good. |
| p,p'-Oxybis benzene sulfonyl hydrazide | do | do | Excellent | Excellent. |
| p-Toluene sulfonyl semicarbazide | do | do | Good | Do. |

EXAMPLE VII

This example demonstrates the effect of moisture on azodicarbonamide. A sample of azodicarbonamide was chosen which was completely free of moisture and essentially free of agglomerates. One portion was blended with 1% by weight of fumed silica; another with 2% by weight of calcium silicate; and a third was left in its original form. Each portion was evaluated for dispersion as in Example I. The azodicarbonamide with the additives (dispersing aids) completely dispersed. The untreated portion of azodicarbonamide exhibited rather good dispersion with only an occasional undispersed agglomerate. The remainder of three azodicarbonamide portions were then placed in a closed container over water and dispersion reevaluated at 15, 30 and 60 days.

After 15 days, the untreated azodicarbonamide, when evaluated for dispersion by the procedure of Example I, resulted in a fused film having a great number of undispersed agglomerates of yellow azodicarbonamide on the surface. However, the respective blowing agent samples containing fumed silica and calcium silicate completely dispersed and produced cellular foam having fine, uniform cells. The moisture content of the three samples of blowing agent averaged 0.2% by weight.

After 30 days in the container results were the same as in the 15 days test. The azodicarbonamide blended with calcium silicate was beginning to agglomerate and lose its free-flowing state; however, it did completely disperse.

After 60 days all three samples exhibited incomplete dispersion. However, the respective azodicarbonamide samples blended with fumed silica and calcium silicate were very much superior to the untreated blowing agent in dispersibility in the vinyl plastisol.

Moreover, it is surprisingly found in the case of the samples of azodicarbonamide not blended with any dispersing aid, that agitation in a Waring Blendor after the 15, 30 or 60-day storage period and immediately prior to the dispersion test results in poorer rather than improved dispersion. It is hypothesized that the water picked up by the azodicarbonamide in the simulated 100% relative humidity environment was sufficient to cause the agitation to result in packing together of the particles.

EXAMPLE VIII

One percent of fumed silica was blended with azodicarbonamide for one minute in a Waring Blendor. A second sample of azodicarbonamide was blended in the same manner, but no dispersing aid was added. One percent by weight of each blowing agent was then respectively dry tumbled with low density polyethylene (melt index of 2 grams/10 minutes at 190° C., ASTM D 1238) and the resultant blend of polyethylene and blowing agent was extruded from a ¾ inch extruder through a ribbon die. The extruder was maintained at 320° F. in all the zones thereof to prevent decomposition of the blowing agent.

Approximately 4.5 gram sections of the respective extruded material were placed between two ferro-type plates and 8 to 10 mil films pressed at 300° F. The press cycle was one minute with the platens closed, followed by an increase in pressure to 20,000 p.s.i. during the second minute and holding of the 20,000 p.s.i. pressure for an additional two minutes. The respective films were cooled and removed from the plates and dispersion of the undecomposed blowing agent observed. The plain blowing agent was relatively poorly dispersed in the polyethylene film while dispersion was much improved in the case of the blowing agent blended with fumed silica.

The respective samples from the first extruder run were then chopped and passed through the extruder a second time. Films were again pressed and dispersion observed. The blowing agent without the dispersing aid was still not completely dispersed although the dispersion was improved compared with only one extruder run. The blowing agent blended with fumed silica resulted in only an occasional undispersed agglomerate in the polyethylene film; moreover, at higher extruder temperatures, resulting in a more fluid condition of the material in the extruder, complete dispersion resulted.

Pieces of the extruder material were then pressed at 400° F. into 8–10 mil films. The cycle on the press was as follows: close for one minute, raise pressure to 12,000 p.s.i. over the second minute and hold for an additional four minutes. In each case, the blowing agent was decomposed and a foamed film produced. The foamed film samples produced from extruded material containing azodicarbonamide alone exhibited large gas pools and imperfections in the film, and often small agglomerates of undecomposed blowing agent were observed. The foamed film prepared from extruded material containing azodicarbonamide blended with fumed silica exhibited a more uniform cell structure and superior quality.

EXAMPLE IX

The purpose of this example is to determine the effect of a filler in a polyvinyl chloride plastisol on the dispersion of the blowing agent in the plastisol. The evaluation was conducted with the following viny formulation:

Ingredients: Parts by weight
  Polyvinyl chloride dispersion resin [1] _____ 100
  Dioctyl phthalate _____ 95
  Epoxidized soya oil _____ 5
  Dibasic lead phthalate _____ 3
  Calcium carbonate (filler) _____ 40
  Azodicarbonamide _____ 2

[1] Specific viscosity=0.36 in nitrobenzene at 30° C. (ASTM D-1243)

Part A

All the ingredients of the above formulation except the azodicarbonamide were weighed into the mixing bowl of a Hobart mixer and mixed for 10 minutes. The azodicarbonamide was then mixed with the resulting plastisol in the Hobart mixer for an additional 10 minutes. Ten mil films were then drawn on a ferro-type plate and fused for one minute or foamed for six minutes, respectively, at 350° F. in a circulating hot air oven and dispersion of the blowing agent was observed.

Many undispersed agglomerates of azodicarbonamide could be seen in the fused unfoamed film. In the foamed film these agglomerates resulted in many large blisters and blowholes on the surface and throughout the foam structure.

Part B

All of the ingredients except the calcium carbonate and the azodicarbonamide were mixed for 10 minutes as in Example IX-A. The azodicarbonamide and calcium carbonate were then added and mixed for an additional 10 minutes. The fused unfoamed films and foamed films were similar to those of Example IX-A.

From Examples IX-A and B it can be concluded that dispersion of a blowing agent is not improved by the presence of a filler in a polyvinyl chloride plastisol, nor is dispersion improved when the filler and the blowing agent are added in the same mixing step. Hence, it has been demonstrated that the filler in a polyvinyl chloride plastisol has very little effect, if any, on the dispersion of a chemical blowing agent. Presence of a filler in a plastisol cannot, therefore, take the place of blending of the blowing agent with a dispersing aid according to the present invention.

EXAMPLE X

The purpose of this example is to evaluate the effect of adding fumed silica to moist azodicarbonamide or to a slurry of azodicarbonamide to improve dispersion of the azodicarbonamide in a vinyl plastisol.

Part A

To 99 grams of azodicarbonamide in a Waring Blendor, 2 grams of water were added dropwise by means of an eyedropper. Mixing was performed after each few drops. When all the water was added, blending was continued for five minutes with scraping of the container walls at one-minute intervals. One gram of fumed silica was then added with five additional minutes of mixing. A sample of this product (Sample No. 4307-2) was then tested for dispersion in a vinyl plastisol by the procedure outlined below under the heading "Dispersion Test." The remaining product was dried for 24 hours and at 45° C. (Sample No. 4307-1) and tested for dispersion by the same procedure. A portion of the dried sample was delumped for one minute in the Waring Blendor (Sample No. 4307-1A) and also tested for dispersion by the same procedure. The results are tabulated below.

Part B

To 99 grams of azodicarbonamide in a Waring Blendor, one gram of fumed silica was added followed by five minutes of mixing. Two grams of water were then added as in Example X-A. A sample of this product (Sample No. 4307-4) was tested for dispersion by the procedure described below. The remaining portion was dried as in Example X-A (Sample No. 4307-3). A portion of the dried sample was delumped for one minute in a Waring Blendor (Sample No. 4307-3A). The last two mentioned samples were also evaluated for dispersion by the same procedure.

Part C 99 grams of azodicarbonamide were slurried with 200 grams of water in a Waring Blendor. To this slurry was added one gram of fumed silica, and the slurry was then mixed for five minutes. The product was then filtered on a Buechner funnel, a vacuum applied to the funnel to draw water from the product and thus bring the product to a damp dryness, and the product in this condition was transferred to a watch glass to complete drying for 24 hours at 45° C. The dried product was divided into two portions. One was delumped for one minute in a Waring Blendor (Sample No. 4307-5) and the second used as is (Sample No. 4307-6). Both samples were tested for dispersion by the procedure described below.

Part D

A sample of azodicarbonamide containing 11.0% moisture (Sample No. 4314-1) was evaluated by the dispersion test described below. The results are tabulated below.

Part E

A portion of the sample of Example X–D was blended in a Waring Blendor for one minute (Sample No. 4314–2) and the dispersion test was carried out. The results are tabulated below.

Part F

With a sample as in Example X–E was blended 1% by weight of fumed silica in a Waring Blendor for one minute (Sample No. 4314–3). Evaluation for dispersion was again by the test described below and the results are tabulated below.

Part G

A sample as in Example X–F was dried in an oven at 45° C. for 96 hours (Sample No. 4314–4). The same test procedure for dispersion was carried out and the results are tabulated below.

Part H

A sample as in Example X–G was delumped for one minute in a Waring Blendor (Sample No. 4314–5) and the dispersion test was again employed. The results are tabulated below.

Part I

A sample as in Example X–D was dried for 96 hours at 45° C. (Sample No. 4314–6). Dispersion was tested by the procedure described below and the results are tabulated below.

Part J

A sample as in Example X–I was delumped in a Waring Blendor for one minute (Sample No. 4131–7). The dispersion test described below was carried out and the results are tabulated below.

Dispersion test

Each of the samples was tested in the following formulation:

| Ingredients: | Parts by weight |
|---|---|
| Polyvinyl chloride dispersion resin [1] | 100 |
| Dioctyl phthalate | 95 |
| Epoxidized soybean oil | 5 |
| Dibasic lead phthalate | 3 |
| Azodicarbonamide | 2 |

[1] Specific viscosity=0.36 in nitrobenzene at 30° C. (ASTM D–1243).

The procedure used was as follows:

(a) All the ingredients of the above formulation were weighed into a Hobart mixing bowl and mixed for ten minutes at speed No. 6.

(b) Ten mil films of the resultant plastisol were drawn on a ferro-type plate and fused in a forced air oven at 350° F. for one minute.

(c) Four 1 square inch areas were marked on the films and the undispersed agglomerates of azodicarbonamide counted and the average figure recorded in the following table of results.

TABLE 3

| Sample | Procedure | Number of undispersed particles/sq. in. |
|---|---|---|
| Part A: | | |
| 4307–1 | Water, fumed silica, dry | 15.75 |
| 4307–1A | Water, fumed silica, dry, delump | (1) |
| 4307–2 | Water, fumed silica | >25.00 |
| Part B: | | |
| 4307–3 | Fumed silica, water, dry | 14.75 |
| 4307–3A | Fumed silica, water, dry, delump | (1) |
| 4307–4 | Fumed silica, water | >25.00 |
| Part C: | | |
| 4307–5 | Slurry-fumed silica, dry, delump | 1.25 |
| 4307–6 | Slurry-fumed silica, dry | >25.00 |
| Part D: 4314–1 | As is (11% moisture) | 2.50 |
| Part E: 4314–2 | Part D plus delump | >25.00 |
| Part F: 4314–3 | Part E plus blend with 1% fumed silica | 17.50 |
| Part G: 4314–4 | Part F plus dry | 18.25 |
| Part H: 4314–5 | Part G plus delump | None |
| Part I: 4314–6 | Part H plus dry | 21.25 |
| Part J: 4314–7 | Part I plus delump | None |

[1] Complete, none.

The foregoing results indicate that when the blowing agent is in the form of a slurry or contains a higher proportion of water than would be picked up from the atomsphere, drying followed by delumping is necessary in order for the dispersing aid addition according to the invention to be effective.

While the invention has been described with reference to specific examples, it is to be understood that these are intended to illustrate the invention and not to limit the scope of the invention as defined by the appended claims.

What is claimed is:

1. A solid, particulate composition comprising a mixture of a solid, particulate blowing agent selected from the group consisting of azodicarbonamide, p,p'-oxybis(benzene sulfonyl hydrazide), p-toluene sulfonyl hydrazide, and p-toluene sulfonyl semicarbazide and a solid, particulate inert inorganic compound selected from the group consisting of aluminum oxide, silica aluminate, hydrated magnesium silicate, calcium silicate, silica gel, fumed silica, magnesium oxide, titanium dioxide, dibasic calcium phosphate, tribasic calcium phosphate, sodium silica aluminate, potassium silica aluminate, calcium silica aluminate, diatomaceous silica, sodium silicate, potassium silicate and calcium silicate, the proportion of the inert compound in the composition being 1 to 5% by weight, based on the weight of the blowing agent.

2. A solid, particulate composition according to claim 1, in which the blowing agent is azodicarbonamide.

3. A solid, particulate composition according to claim 2, in which the inert compound is fumed silica.

References Cited

UNITED STATES PATENTS

| | | | |
|---|---|---|---|
| 2,772,984 | 12/1956 | Helfaer | 106—289 |
| 2,816,078 | 12/1957 | Ferris | 252—350 |
| 3,418,238 | 12/1968 | Wilson | 252—1 |

JOHN D. WELSH, Primary Examiner

U.S. Cl. X.R.

252—363.5, 259.5